(12) United States Patent
Melcher et al.

(10) Patent No.: US 11,445,339 B1
(45) Date of Patent: Sep. 13, 2022

(54) EXTENDED REALITY SYSTEM WITH VIRTUAL TAGGING FOR OUTPUT MANAGEMENT USING THE INTERNET OF THINGS

(71) Applicants: Michael J. Melcher, Honolulu, HI (US); Kyle Bateman, Plano, TX (US)

(72) Inventors: Michael J. Melcher, Honolulu, HI (US); Kyle Bateman, Plano, TX (US)

( * ) Notice: Subject to any disclaimer, the term of this patent is extended or adjusted under 35 U.S.C. 154(b) by 80 days.

(21) Appl. No.: 16/911,581

(22) Filed: Jun. 25, 2020

(51) Int. Cl.
*H04W 4/18* (2009.01)
*G06K 19/077* (2006.01)
*H04W 4/029* (2018.01)
*G06V 20/20* (2022.01)

(52) U.S. Cl.
CPC ...... *H04W 4/185* (2013.01); *G06K 19/07707* (2013.01); *G06V 20/20* (2022.01); *H04W 4/029* (2018.02)

(58) Field of Classification Search
CPC ....... H04W 4/18; H04W 4/029; H04W 4/185; H04W 12/42; H04W 12/104; H04W 72/121; H04W 88/02; H04W 88/04; H04W 92/18; H04W 4/80; G06K 9/00; G06K 19/077; G06K 9/00671; G06K 19/007707; G06K 7/1093; G06K 9/00624; G06Q 30/0639; G06Q 30/0621; G06Q 10/087; G06Q 10/00; G06Q 10/02; G06Q 10/025; G06Q 10/0833; G06T 7/00; G06T 9/00; G06T 19/00; G06F 16/50; H04L 12/1831; G08B 13/2462; G08B 13/2402; G08B 13/2485

See application file for complete search history.

(56) References Cited

U.S. PATENT DOCUMENTS

| | | | |
|---|---|---|---|
| 11,132,519 B1 * | 9/2021 | Melcher et al. ... | G06K 7/10722 |
| 2013/0066878 A1 * | 3/2013 | Flynn et al. .................. | 707/741 |
| 2014/0002496 A1 * | 1/2014 | Lamb et al. .................. | 345/633 |
| 2014/0253589 A1 * | 9/2014 | Tout et al. ............ | G06T 19/006 |
| 2014/0289730 A1 * | 9/2014 | Fitzgerald et al. ...... | G06F 9/455 |
| 2015/0078123 A1 * | 3/2015 | Batcheller et al. ...... | G01S 15/02 |
| 2018/0264347 A1 * | 9/2018 | Tran et al. ........... | A63B 71/145 |
| 2019/0094540 A1 * | 3/2019 | Greenwood et al. ....................... G02B 27/017 |
| 2020/0294293 A1 * | 9/2020 | Boeing, II et al. ..... | G06T 11/60 |

FOREIGN PATENT DOCUMENTS

GB    2586727 A  *  3/2021    ............... G06K 9/00

* cited by examiner

*Primary Examiner* — Meless N Zewdu
(74) *Attorney, Agent, or Firm* — Leavitt Eldredge Law Firm

(57) ABSTRACT

A virtual tagging system that includes a management system that allows for multiple authors to manipulate and contribute to an output, the output being displayed on a smart device and being displayed in an augmented reality.

7 Claims, 11 Drawing Sheets

US 11,445,339 B1

EXTENDED REALITY SYSTEM WITH VIRTUAL TAGGING FOR OUTPUT MANAGEMENT USING THE INTERNET OF THINGS

BACKGROUND

1. Field of the Invention

The present invention relates generally to asset tagging systems, and more specifically, to a system and method for output management incorporating the use of virtual tagging for management. In addition, the system of the present invention can be used to organize and manage a plurality of virtual asset tags.

2. Description of Related Art

Asset tagging are well known in the art and are effective means to identify and track assets. For example, FIG. 1 depicts a system 101 of two conventional asset tags 103, 105. Tag 103 is a conventional adhesive style asset tag having a barcode 105 configured to be scanned by a device, wherein the barcode is associated with data related to the asset, such as a serial number, ownership data, and the like. Similarly, tag 107 is a conventional RFID tag configured to wirelessly communicate with one or more scanners to provide data to a server, wherein the data can include asset information such as a serial number, and ownership data. Further, tag 107 can provide location data to a server for additional monitoring.

One of the problems commonly associated with system 101 is limited use. For example, tag 105 merely provides information once scanned to a computing device, thereby forcing a user to physically scan the barcode to retrieve such information. Further, tag 107 requires extensive infrastructure of scanners to accurate and effectively transmit data to a server.

Accordingly, although great strides have been made in the area of asset tagging systems, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
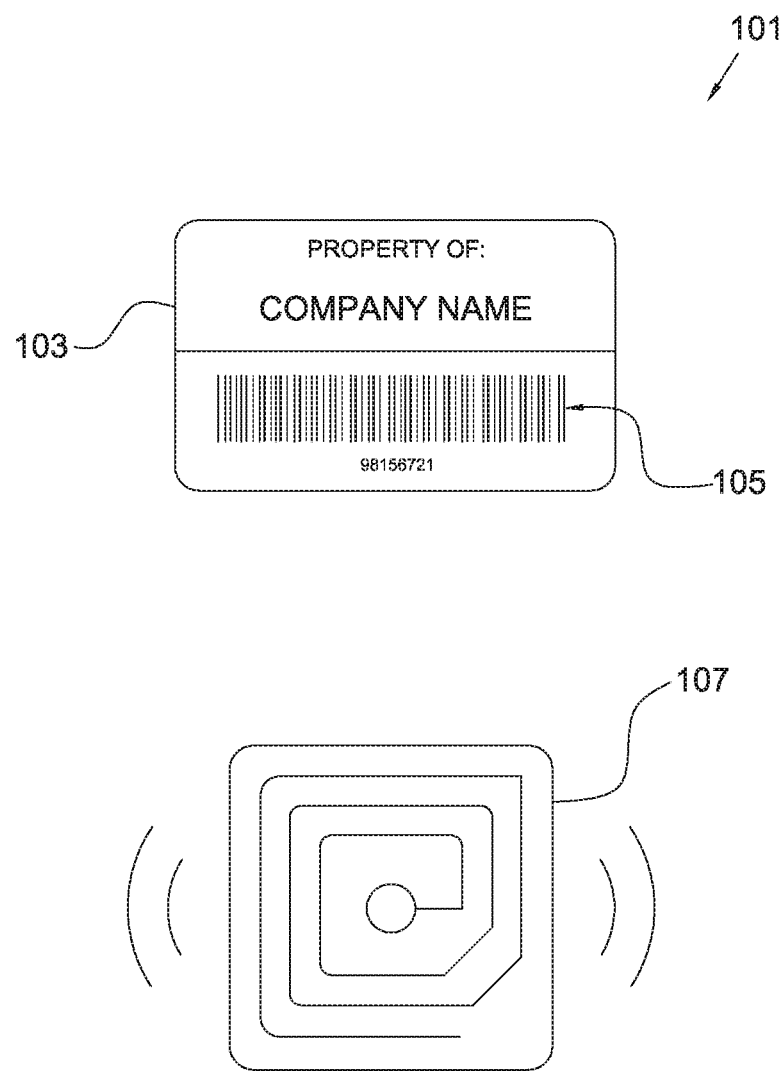
FIG. 1 is a front view of a system having two common styles of asset tags.
Figure 2:
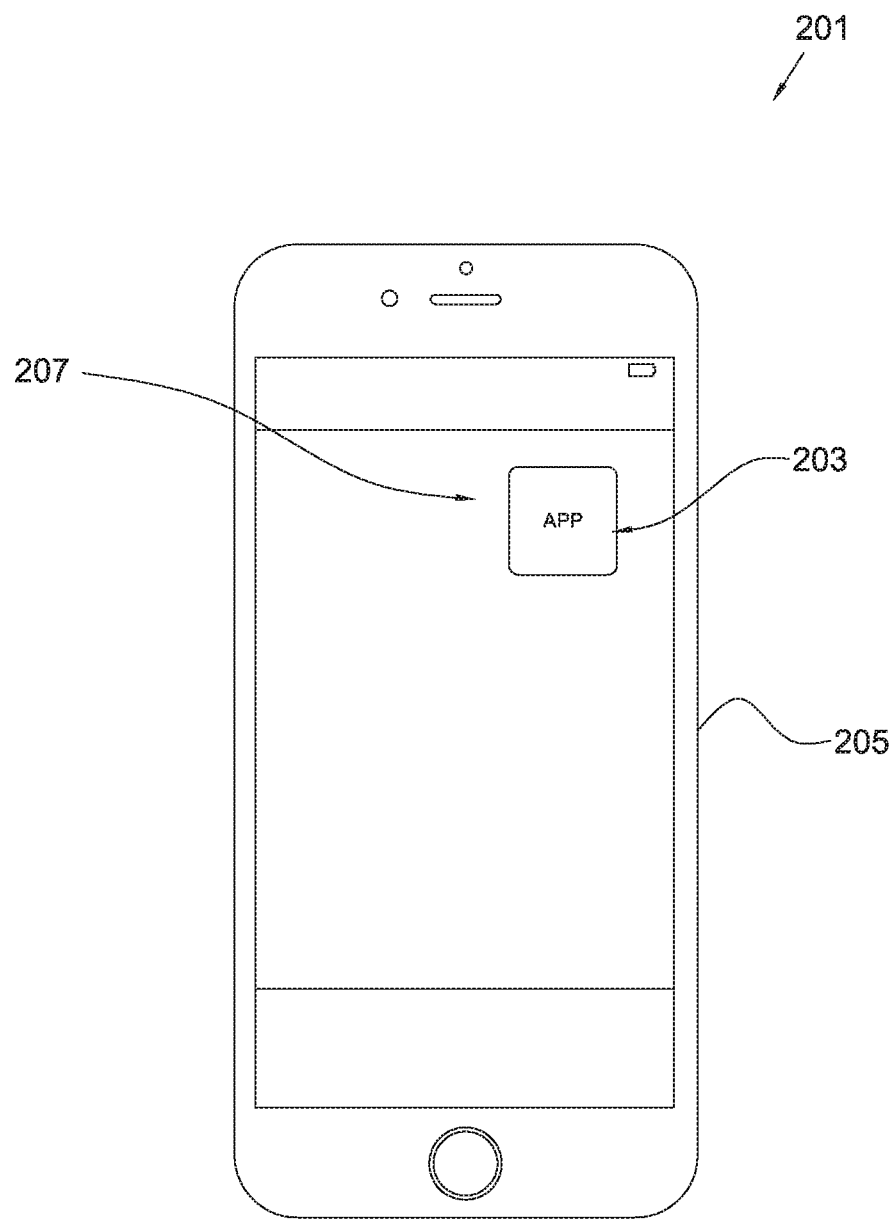
FIG. 2 is a simplified front view of a smart device with a virtual asset tagging system in accordance with a preferred embodiment of the present application.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional tagging systems. Specifically, the present invention provides a means to organize, and designate a variety and plurality of features associated with each virtual asset tag, to allow the user to manage assets. In addition, the system of the present invention provides for a management system to allow contributors to create and manage an output. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Referring now to the drawings wherein like reference characters identify corresponding or similar elements throughout the several views, FIGS. 2-8 depict various views of elements of a virtual asset tagging system and method in accordance with a preferred embodiment of the present application. It will be appreciated that method and system overcomes one or more of the above-listed problems commonly associated with conventional asset tagging systems.

In the contemplated embodiment, system 201 includes a platform 203 accessible via a smart device 205, such as a mobile phone, tablet, portable computer, and the like. The smart device 205 includes at least location determination technology, a camera, and a display 207. In the preferred embodiment, the display 207 is a touch screen, and/or other I/O device, such as hand gestors used with the MS Hololens, to be manipulated by the user.

Platform 203 provides a means to virtually tag a plurality of assets, including tangible assets such as furniture, equipment, purchased products, and the like, as well as intangible assets, such as a schedule, a task, intellectual property, human capital, company goodwill, or the like to be shared among coworkers or family.

In the preferred embodiment, the platform 203 provides the user with a multitude of options for creating each asset tag as needed. For an example, should the user desire to create a virtual asset tag for a vehicle, the user can tag the vehicle through the platform 203, and input information, such as the type of vehicle, purchase date, price, photos, videos, etc. Some data may be automatically inputted into the virtual asset tag, such as through connecting to a vehicle dealership database, or any other means.

Upon an initial creation of the virtual asset tag, a unique identifier is assigned to the asset, and to remain assigned to the asset. The user can the proceed to designate other criteria and data to be associated with the asset, which can be shared among users through means known in the art. As will be discussed below, the additional data and criteria will be referred to as tags, however, it must be understood that each asset can have designations of more than one type of tag, wherein the types interact to create an effective overall history related to the asset.

Figure 3:
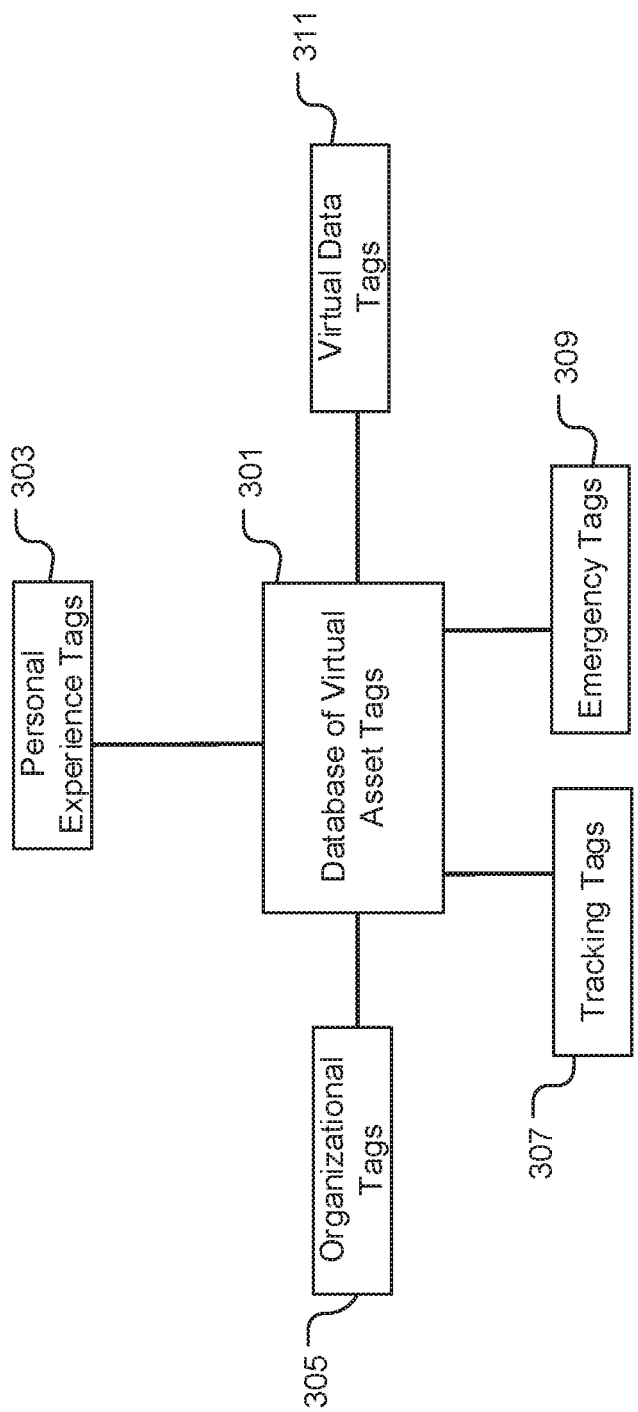
FIG. 3 is a simplified schematic of categories of virtual asset tags in accordance with the present application.

In FIG. 3, a simplified schematic demonstrates a plurality of categories of asset tag types 301. These categories are provided for simplicity in understanding the various roles, as will be discussed herein. In the preferred embodiment, there are personal experience tags 303, organizational tags 305, tracking tags 307, virtual data tags 309, and emergency tags 311.

Virtual data tags 309 are configured to collect online data relating to an asset, such as URL sites relevant to the asset. For example, should a user desire to link a physical asset to a URL, such as a place to purchase the asset, or the URL having information about the asset, such a tag can be created, thereby placing the URL in the asset's virtual tag record.

Emergency tags 311 are configured to trigger an alarm or notification to the user, such as through the mobile phone or computing device.

Figure 4:
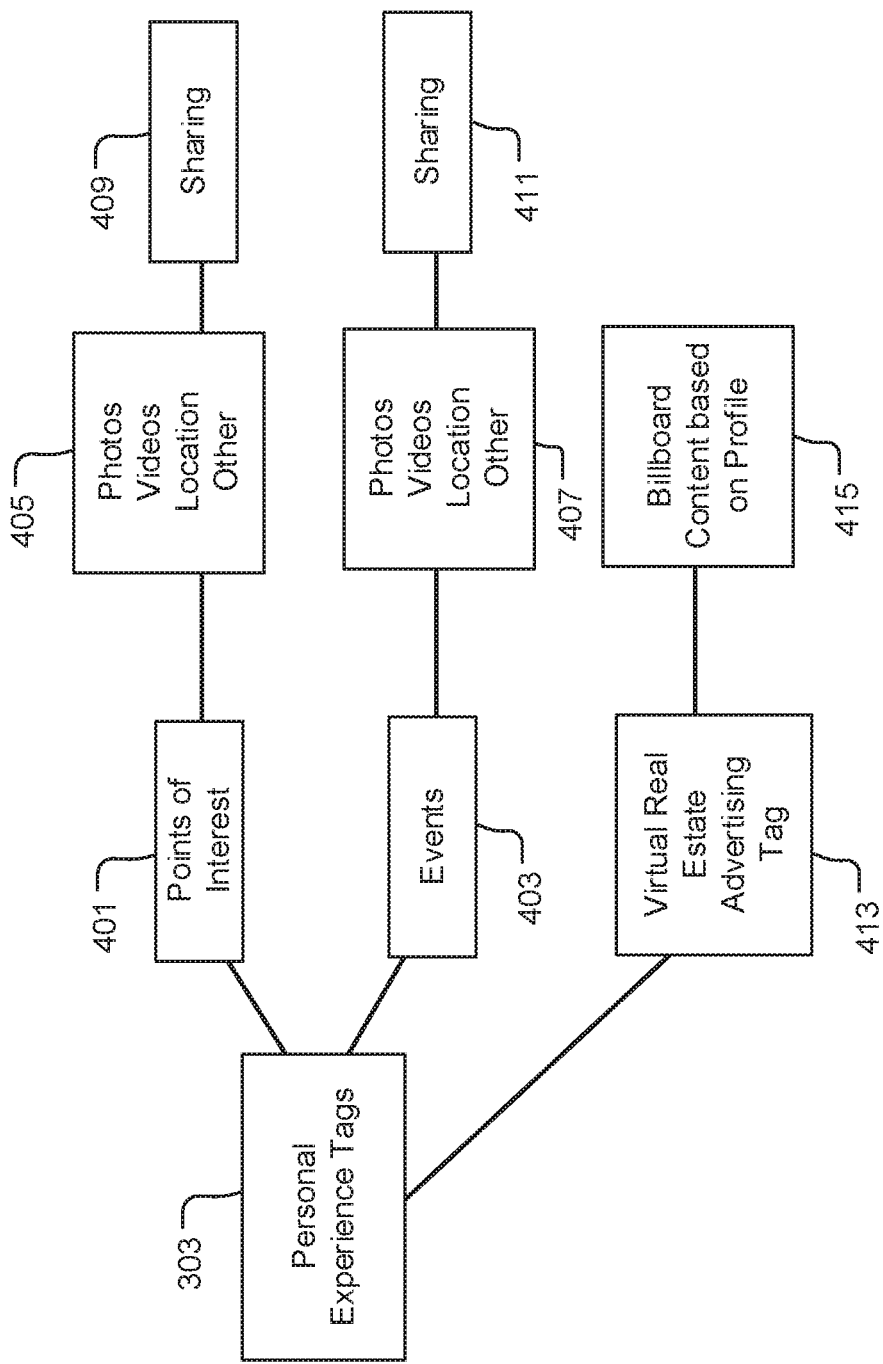
FIG. 4 is a simplified schematic of a personal experience asset tags in accordance with the present application.

In FIG. 4, a simplified schematic depicts a plurality of tags relating to the personal experience tags 303. Personal experience tags 303 can allow users to create virtual tags relating to points of interest 401 and/or events 403. These tags are appropriate when a user take a trip, goes to an interesting location, attends a party, or the like. Data 405, 407 relating to the point of interest or event, including photos, videos, location, and any other relevant information, can then be tied to the virtual tags. Further, it should be appreciated that the user can share 409, 411 these tags with others through the virtual tagging platform. Another personal experience tag 303 contemplated is a virtual real estate advertising tag 413, wherein the tag 413 is programmed to be associated with an advertisement, such as a billboard 415 and established to provide the user with varying content based on the user's profile as associated with the virtual tagging platform. For example, as the user accesses the tag 413 (such as through pointing their electronic device having a camera at the billboard, the user receives an advertisement that is appropriate for the user based on the user's profile.

Figure 5:
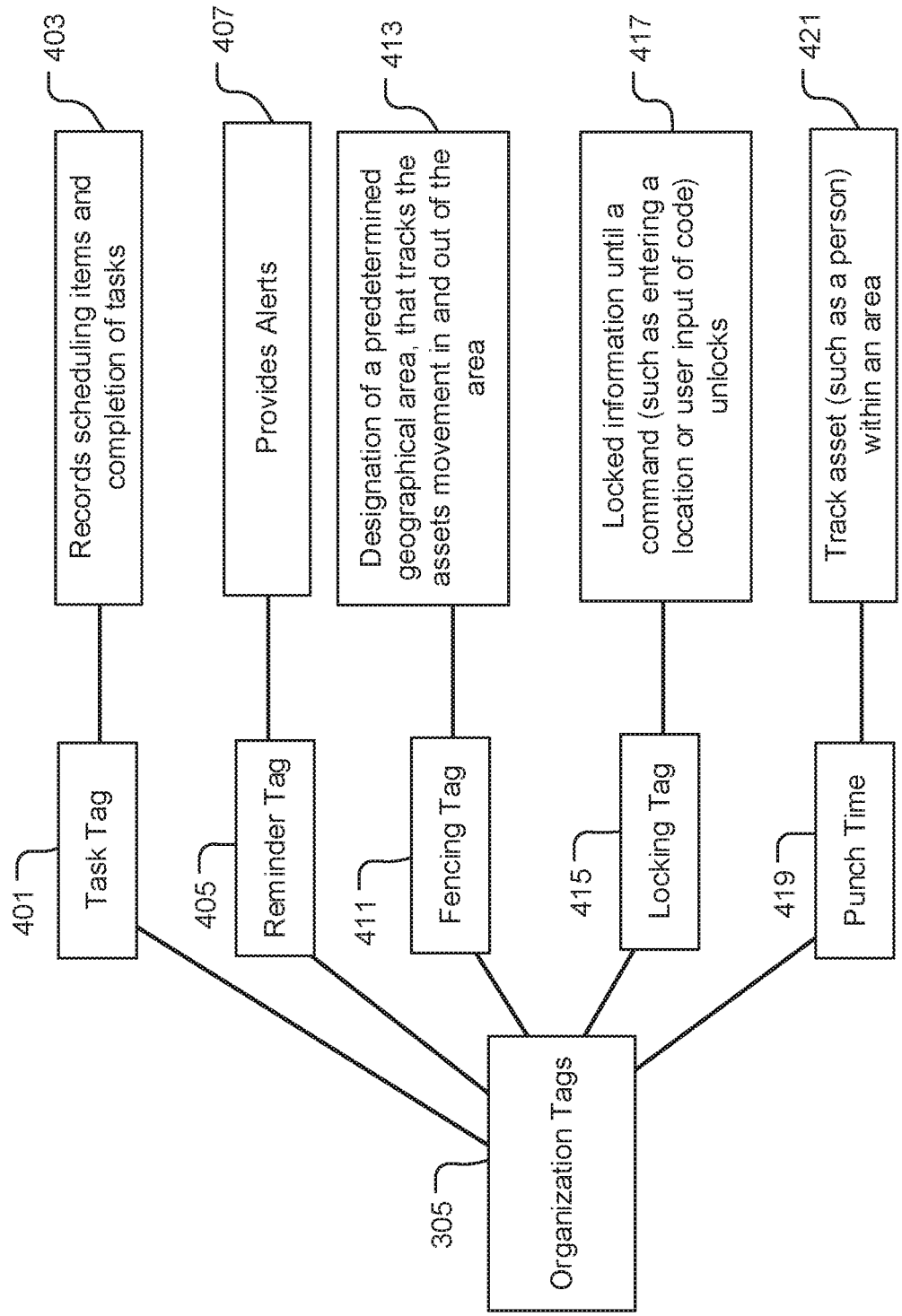
FIG. 5 is a simplified schematic of organizational asset tags in accordance with the present application.

In FIG. 5, a simplified schematic depicts a plurality of tags relating to the organizational tag category 305. Organizational tags can be added into any virtual asset tag, to allow the user to keep track of calendaring, tasks, events, and the like. A task tag 501 can be used to record schedules and track the completion of tasks. These tags are beneficial for use in companies, as well as for use in the home, such as tracking every day tasks. This allows a user to keep a log of activity within a company or within the home, and the people involved, as shown with box 403. A reminder tag 405 can further be used along with, or independent with the task tag, to provide the user with alerts/reminders regarding either scheduled events, or any other trigger that the user inputs, as shown with box 407. One example of an appropriate task tag and reminder tag, would be the tagging of a simple chore, such as taking out the garbage on every Wednesday, the user can set up this virtual tag to provide them with a reminder every Wednesday, and further indicate completion of the tag, wherein a log is created regarding the person/time of the completion.

Another organizational tag is a fencing tag 411, which is configured to allow a user to designate a predetermined geographical area, and wherein movement of the tag in and out of the area is tracked, as shown with box 413. As an example, the asset could be a child going to school, wherein the parent can designate the school as the predetermined location, based on a GPS unit carried on the child, such as a phone, the child's movement to and from school could be logged and tracked.

Additional organizational tags include locking tags 415, wherein access to the data of the tag is restricted until unlocked via a command, as shown with box 417. Such commands could include user input of identifying information, or movement of the asset or user into a predetermined location.

A final organizational tag discussed herein is a punch time tag 419 configured to track the time spent by an asset, such as a person, within a predetermined area, as shown with box 421. This tag could allow employers to know how long an employee is within an area, and then better understand workload and time management.

Figure 6:
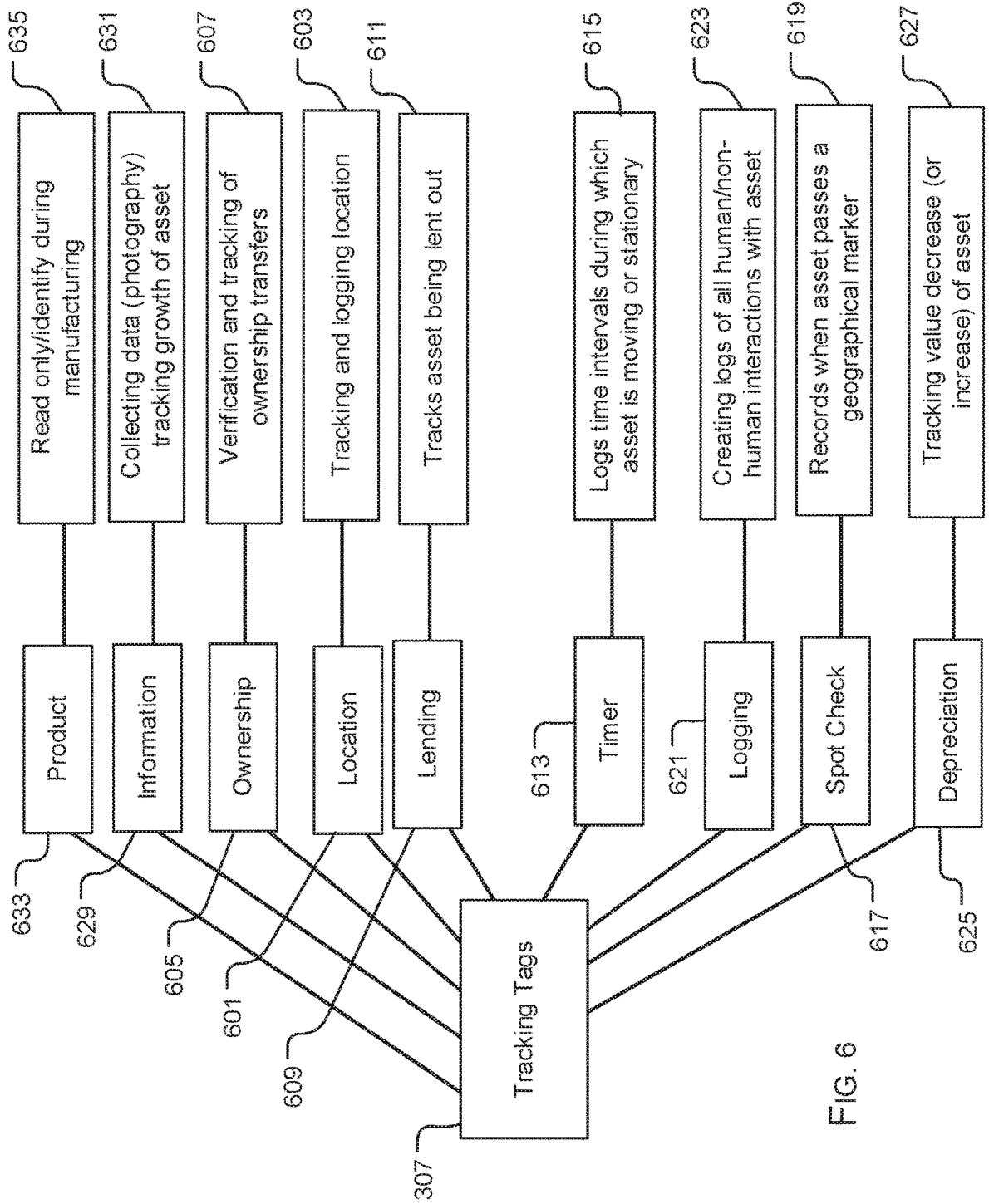
FIG. 6 is a simplified schematic of tracking tags in accordance with the present application.

In FIG. 6, a simplified schematic depicts a plurality of tracking tags 307 contemplated. It should be appreciated that the purpose of all tracking tags is to record and log data associated with an activity of the asset. Contemplated tracking tags include location tracking 601 configured to log time-stamped locations of the asset, as shown with box 603. Ownership tags 605 are used to track and record transfers of ownership of a tag, as shown with box 607. Within ownership tags can be additional information, such as contracts, verification of ownership, and the like. Lending tags 609 can be used to track the lending of an asset, such as a time for lending, the recipient, verification of identifies, consent of the parties, and any other helpful information, as shown with box 611.

Time interval tags 613 are used to track intervals when an asset is moving or stationary, as shown with box 615. Spot check tags 617 allow a user to record when an asset passes a geographical marker, as shown with box 619. Logging tags 621 allow for the tracking of all human interaction with an asset, as shown with box 623. This type of tag allows for a complete record of the asset, similar to a chain of custody, wherein each person logs their association with the asset.

Other tracking tags include depreciation/appreciation tags 625 configured to track a depreciation or appreciation of the asset, as shown with box 627. An information tag 629 can be used and is configured to record data, such as photographs, associated with a changing asset, as shown with box 631. For example, a drone or similar UAV with a camera could be implemented to photograph an asset such as the construction of a building, wherein photographs taken by the drone are recorded and stored in connection with the building's virtual asset tag.

Lastly, a product tag 633 is configured to be assigned to an asset as a read only tag, wherein other users can have access to the information without the ability to change the information, as shown with box 635. Such tags are beneficial during manufacturing.

It should be appreciated that one of the unique features believed characteristic of the present application is the ability to input an abundance of data into a database associated with a virtual asset tag and track any changes associated with the asset. It should be appreciated that all of the features discussed above can be mixed and matched into a virtual asset tag to create a customized network of virtual tags depending on the user's needs.

Figure 7:
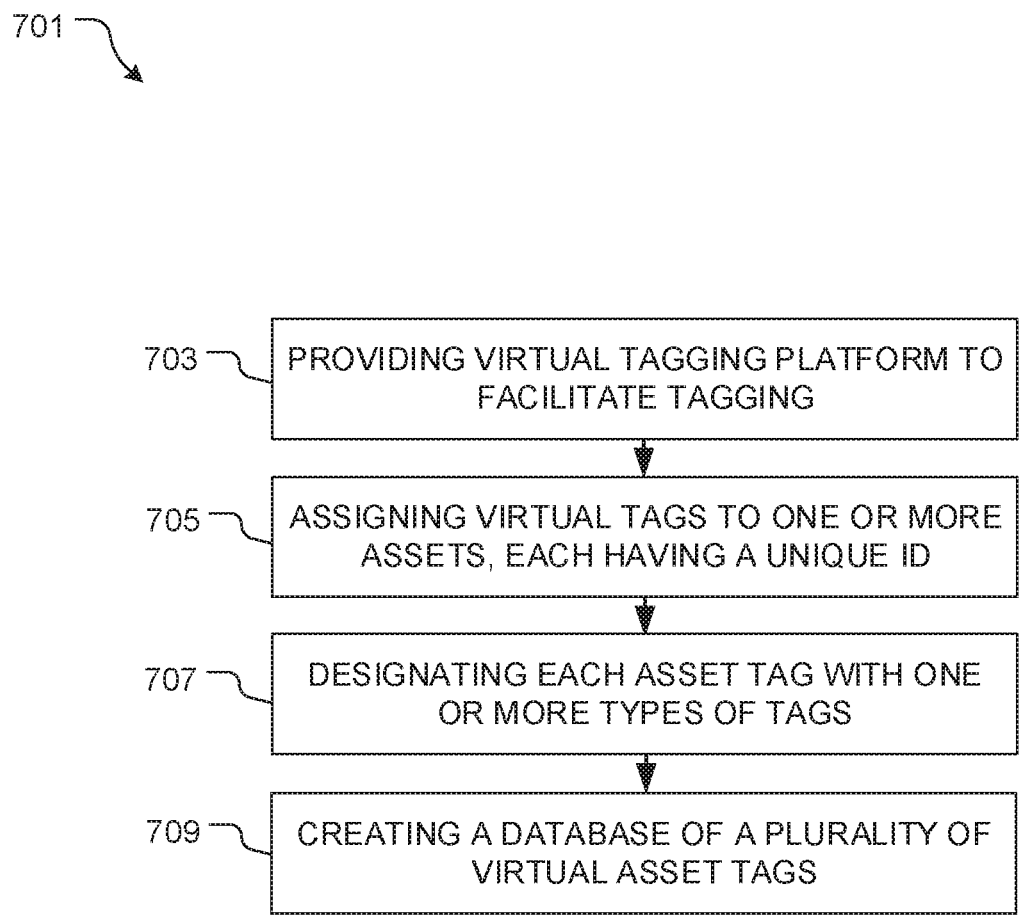
FIG. 7 is a flowchart of the method of use of the system of the present application.

In FIG. 7, a flowchart depicts a summarized method of tagging a plurality of assets. The user accesses the virtual tagging platform via a computing device and facilitates the tagging of one or more assets, as shown with box 703. As the user creates virtual asset tag, each having a unique identifier, data can begin to be input relating to each of the assets, as shown with box 705. The user can designate type of asset tags to create a database of a plurality of virtual asset tags, as shown with boxes 707, 709.

Figure 8:
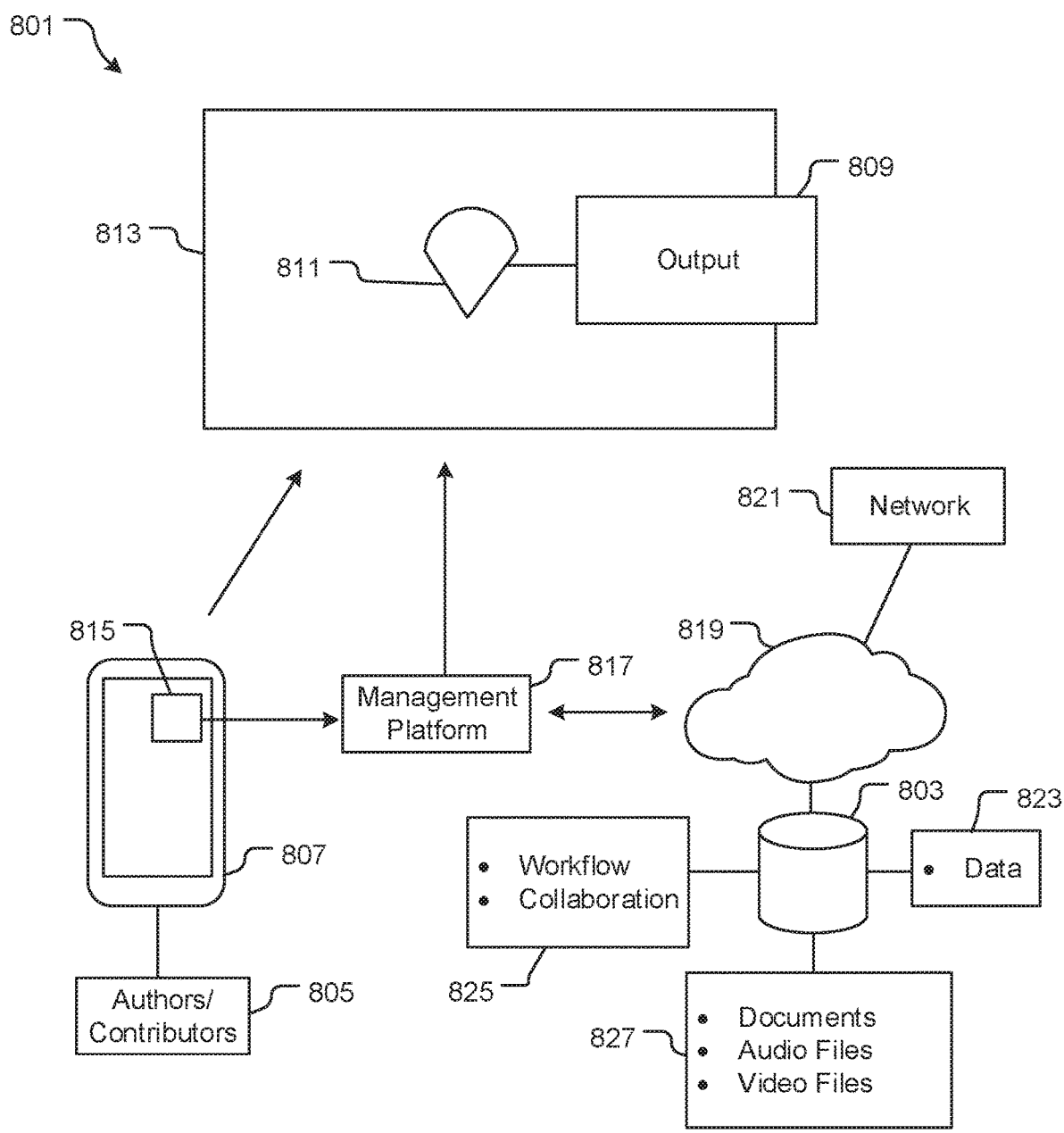
FIG. 8 is a schematic of an output management system in accordance with the present application.

In FIG. 8, a schematic of an embodiment of an output management system 801 is shown. It should be appreciated that system 801 can include any of the features discussed, and further includes a management system 803 that provides for one or more users/authors/contributors 805 to use a smart device 807 to create an output 809.

It should be appreciated that the output 809 is tied to a virtual tag 811 which will be presented to the one or more contributors 805 within an augmented display 813. As will be discussed, the augmented display can be in augmented reality, virtual reality, mixed reality, and/or cross reality.

System 801 allows for a contributor to use a mobile application 815 which provides access to a management platform 817 to create, manipulate, and follow the output 809. The management platform 817 communicates with the management system 803 via a server 819 and a network 821. The management platform 817 allows a contributor to access, view, and manage data 823, create workflows and collaborations 825, and implement documents, audio files, video files, and other files 827.

The management system 803 may be any system configured to manage an output, such as a content management system (CSM) or a customer resource management (CRM) system. The system can function similar to conventional CSM and CRM systems, wherein a plurality of contributors can edit and manage the output 809. However, one of the unique features believed characteristic of the present invention is the tying of the output 809 to a virtual tag for viewing and accessing in an augmented reality.

Figure 9:
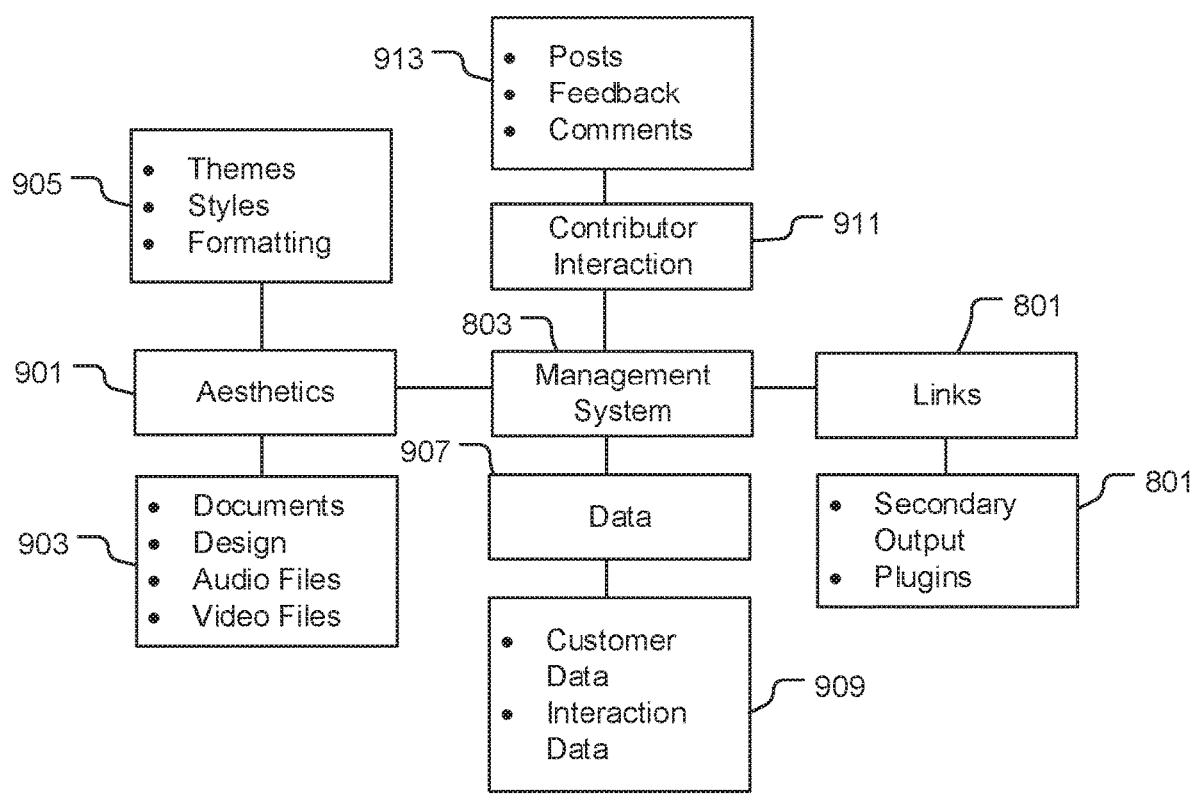
FIG. 9 is a schematic of a management system of FIG. 8.

In FIG. 9, a schematic of some of the features contemplated as part of the management system 803 are shown. The features include an aesthetic portal 901, wherein a contributor may add documents, designs, audio files, video files, and others 903. In addition, the aesthetic portal 901 can allow a contributor to select themes, styles, and formatting 905 associated with the output.

The management system 803 further includes a data portal 907 that will provide contributors with access to customer data and interaction data 909 associated with the output. This data can assist the contributors in improving the output.

The management system 803 further includes a contributor interaction portal 911 wherein contributors can add to and view posts, feedback, and comments 913 as well as any other interactions.

Lastly, the management system 803 further includes a linking portal 915 wherein the output can be linked to secondary outputs and/or plugins 917.

Figure 10:
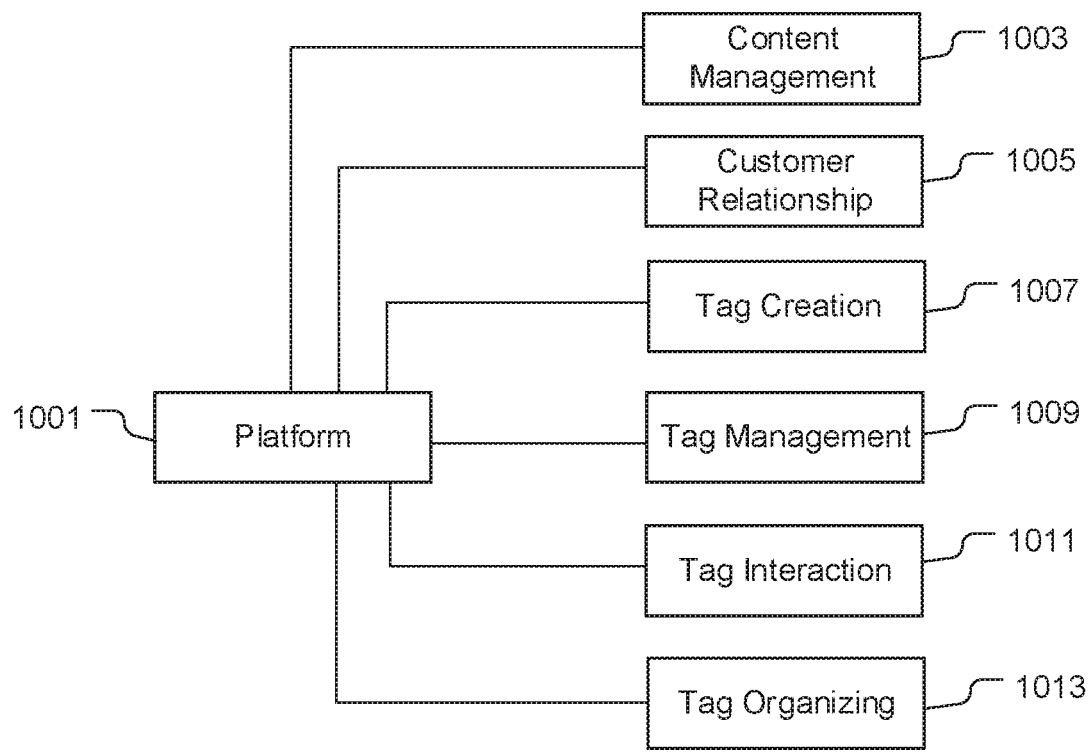
FIG. 10 is a schematic of the features of a platform in accordance with the present invention.

In FIG. 10, a platform 1001 that can be incorporated into any of the systems discussed herein is shown. Platform 1001 combining a virtual asset tagging, organizing, and interaction functionality along with a content management functionality, thereby providing a user with both functions within the same platform. As shown, the platform 1001 will include a content management portal 1003, a customer relationship management portal 1005, a tag creation portal 1007, a tag management portal 1009, a tag interaction portal 1011, and a tag organizing portal 1013.

Figure 11:
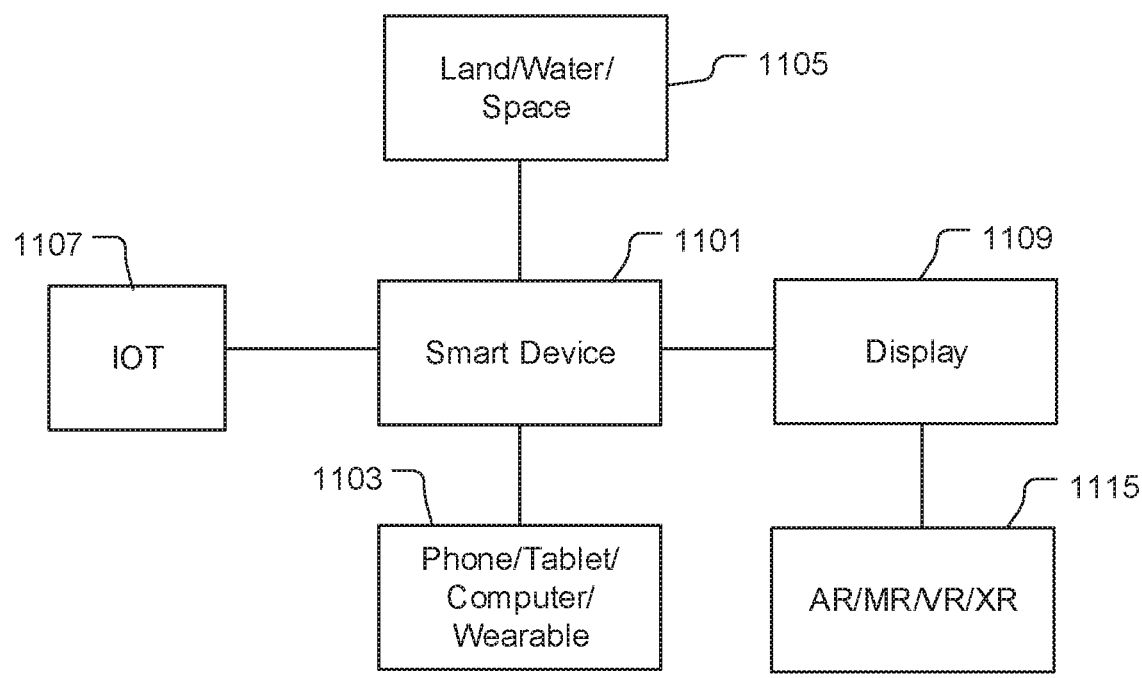
FIG. 11 is a schematic of features of a smart device in accordance with the present invention.

In FIG. 11, a diagram further depicts features associated with a smart device to be used in connection with the systems of the present invention. As shown, a smart device 1101 can vary as is necessary based on the needs of the user. The smart device can be one of a phone, tablet, computer, or a wearable 1103 and can be designed to function in various embodiments, such as land, water, or space 1105. Further, the device can be one of or be configured to communicate with the internet of things 1107. Lastly, as discussed above, the display 1109 of the device may vary and will be configured to operate in augmented reality, mixed reality, virtual reality, and/or extended reality.

Figure 12:
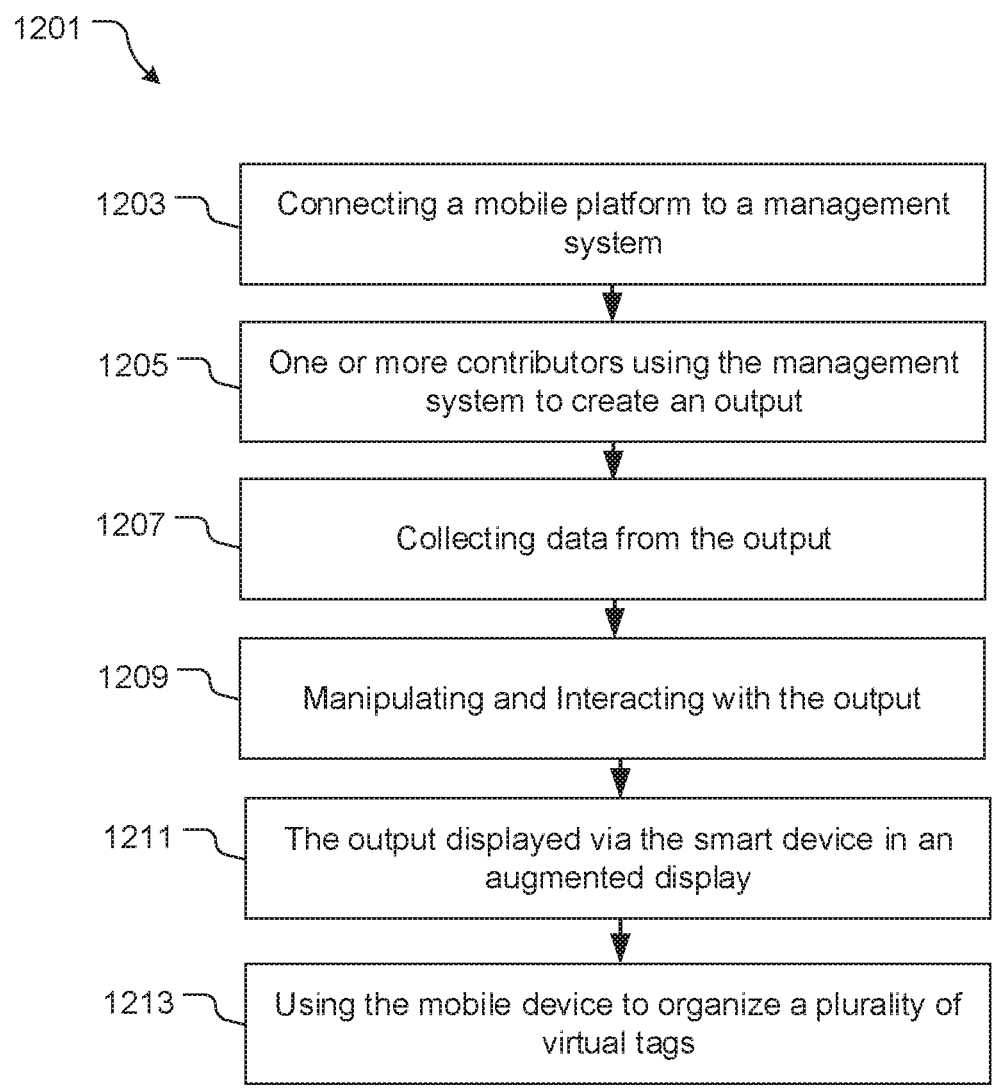
FIG. 12 is a flowchart of a method of use of the system of the present invention.

In FIG. 12, a flowchart 1201 depicts a method associated with the present application. As shown, the system will connect a mobile platform to a management system, as shown with box 1203. As needed and desired, one or more contributors will use the management system to create an output, as shown with box 1205. The output being tied to a virtual tag. Data is collected and the output further being manipulated and interacted with through the mobile platform, as shown with boxes 1207, 1209. The output will be displayed via a smart device in an augmented reality, as shown with box 1211. As desired by the user, the mobile device can be used to further organizing a plurality of virtual tags, as shown with box 1213.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A virtual tagging system, comprising:
    a management server connected to a network accessible by a plurality of users;
    a management system in communication with the management server, the management system configured to operate with the management server to create an output;
    one or more virtual tags associated with the output;
    a smart device having a camera, a GPS, and a display, the smart device configured to communicate with the management server and the management system;
    a mobile platform accessible from the smart device, the mobile platform having, the mobile platform configured to receive commands from one or more contributors to create the output;
    a visual representation of the one or more virtual tags, the visual representation providing the output;
    an organized database of a plurality of virtual asset tags, the organized database being accessible via the smart device and the mobile platform, the plurality of virtual asset tags being organized according to a plurality of types of tags;
    wherein the plurality of types of tags comprise one or more of:
        personal experience tags having data relating to an experience;
        organization tags having data related to an activity or task requiring scheduling and organization;
        tracking tags having data relating to tracking of the asset; and
        virtual data tags having data relating to virtual properties of the asset; and
    a log configured to track all human interaction with the asset;
    wherein the one or more contributors utilize the management system via the mobile platform to manipulate and change the output.

2. The system of claim 1, wherein the management system is a content management system (CMS).

3. The system of claim 1, wherein the management system is a customer relationship management (CRM) system.

4. The system of claim 1, wherein the visual representation is provided in augmented reality.

5. The system of claim 1, wherein the smart device is a wearable augmented reality device.

6. The system of claim 1, wherein the smart device is configured for use under water.

7. The system of claim 1, wherein the visual representation is interactive.

* * * * *